June 23, 1959 C. H. BUECKER 2,891,447
BOMB ARMING CONTROL DEVICE
Filed March 23, 1955
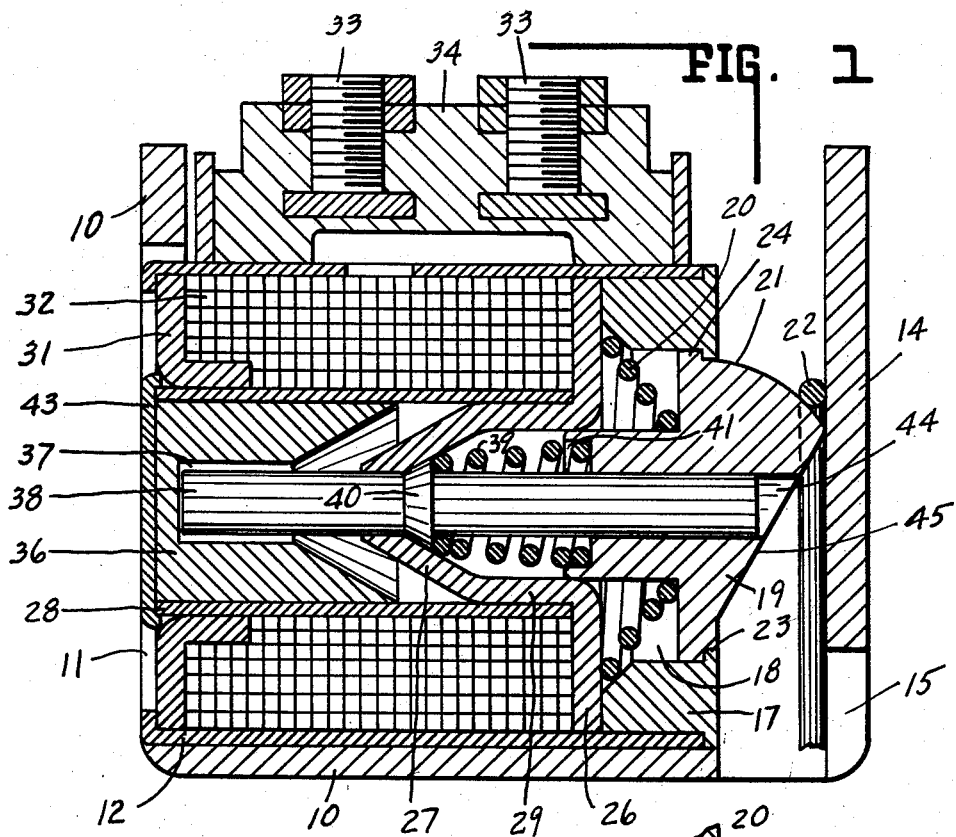
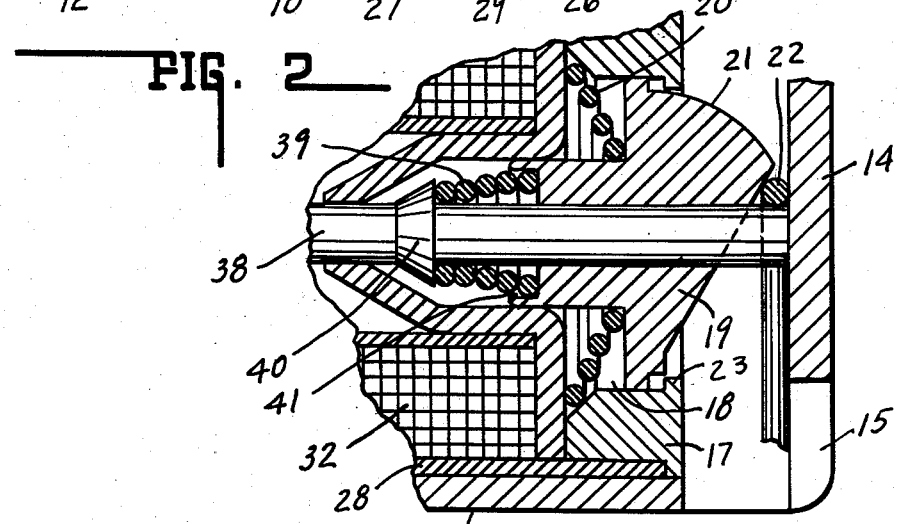
INVENTOR.
CARL HENRY BUECKER.
BY
Lockwood, Galt, Woodard & Smith
ATTORNEYS.

2,891,447
BOMB ARMING CONTROL DEVICE

Carl Henry Buecker, Fort Wayne, Ind., assignor to The Magnavox Company, Fort Wayne, Ind., a corporation Application March 23, 1955, Serial No. 496,097

1 Claim. (Cl. 89—1.5)

This invention relates generally to bomb arming control devices, and more particularly to a solenoid bomb arming control device adapted to be controlled remotely for permitting a bomb to be dropped in either armed or unarmed condition.

Conventional bomb arming control devices comprise a remotely controllable solenoid having a reciprocable armature movable into a position for tripping a lanyard or other arming wire device, whereby when a bomb is dropped, the lanyard or wire pulls free of the bomb and operates an arming mechanism. Bomb arming control devices of this type also include releasable retainer means effective to permit release of the arming lanyard or wire when a bomb is dropped, whereby the bomb may be dropped in unarmed condition. However, conventional bomb arming control devices do not include any mechanism whereby the bomb arming lanyard or wire may be released after it has been retained by the arming control mechanism to drop the bomb in armed condition. Consequently, the lanyard or wire hangs free and in position to be whipped by the air stream and to cause damage to the shell of the aircraft or to otherwise disturb the streamlined configuration of the aircraft and its flying efficiency. When the high speeds of present-day aircraft are appreciated, a hanging lanyard of this type can create substantial wind resistance, and also substantial damage to the aircraft.

Accordingly, the principal object of this invention is to provide a bomb arming control mechanism adapted automatically to release a bomb arming lanyard after an armed bomb is released.

In accordance with this invention there is provided a bomb arming control mechanism comprising a solenoid having a lanyard catch normally in retracted position, a retainer adapted to support the loop of a bomb arming lanyard in position to be intercepted by said catch when it is in actuated position, said catch being arranged to release said lanyard when said solenoid is de-energized.

The full nature of the invention will be understood from the accompanying drawings and the following description and claims:

Fig. 1 is a longitudinal cross section of a bomb arming control device as provided in accordance with this invention.

Fig. 2 is a longitudinal cross section of a portion of the device illustrated in Fig. 1 illustrating the actuated position of the lanyard catch.

In accordance with this invention there is provided a bomb arming control device compirsing a frame or bracket 10 formed to provide an annular hole 11 in its rear side for receiving a cylindrical, magnetic solenoid casing member 12, and formed on its front side to provide an upstanding wall or stop member 14 and an open portion 15.

Within one end of the cylindrical casing 12 there is mounted an annular block 17 fastened by any conventional means to bracket 10 or to the casing 12. Block 17 is formed to provide a cylindrical opening 18 within which is housed a retainer member 19 adapted normally to be pushed outwardly into contact with the wall or stop member 14 by means of a coil spring 20. The retainer 19 is formed to have an upper downwardly sloping or inclined curvilinear surface 21, whereby the loop 22 of a bomb arming lanyard may be trapped between surface 21 and the inner surface of wall 14. Block 17 is provided with an inwardly disposed flange portion 23 for engaging the peripheral flange portion 24 of retainer 19. Spring 20 bears against the surface of an armature guiding member and magnetic pole piece 26 fitted within the solenoid casing 12 and having an inwardly projecting, conical, armature guiding bearing 27.

An inner cylindrical coil form 28 may be mounted over the cylindrical portion 29 of member 26 and within the coil supporting pole piece 31 to be retained in position by spinning the left hand end of casing 12 over the outer surface of pole piece 31. Coil 32 can be wound over the coil form 28, and its terminals may be brought out and attached to the terminal receiving members 33 mounted in a block 34.

An iron slug 36 may be slideably mounted within coil form 28 to be actuated to the right when coil 32 is energized. The slug 36 is formed to provide a socket 37 for receiving the left hand end of a shaft 38. The spring 39, bearing on a collar 40 of shaft 38 and nested within a socket 41 in the retainer 19 normally holds the shaft 38 in the position shown in Fig. 1. A retainer plate 43 may be suitably fastened to the pole piece 31 for confining slug 36 within the coil form 28. The right hand end of shaft 38 rests within a concentric bore 44 in retainer 19, whereby shaft 38 is movable by the slug 36 into an actuated position against stop member 14, as shown in Fig. 2, wherein the loop 22 may be held as illustrated in Fig. 2.

In operation, when bombs are loaded in an aircraft, the arming control lanyard may be placed in the position illustrated in Fig. 1 by forcing it upwardly through the opening 15 into sliding engagement with the sloping surface 45 of retainer 19. Continued upward movement of loop 22 cams the retainer to the left against the action of spring 20 until the loop passes the outer extremity of retainer 19, permitting it to snap into position within the loop, as shown in Fig. 1.

When it is desired to drop a bomb in armed condition, the solenoid 32 may be energized, moving slug 36 to the right and therewith shaft 38 against the action of spring 39, moving shaft 38 into the position shown in Fig. 2. When the bomb is released, the loop 22 of the lanyard is pulled downwardly against inclined surface 21 of retainer 19 camming the retainer inwardly against the action of spring 20. The loop 22 moves downwardly beyond the outer extremity of the retainer 19 and into engagement with the right hand end of shaft 38. This shaft is a loop catch designed to withstand a load of approximately one hundred pounds, and thus the falling bomb causes the arming lanyard to come free thereof, leaving the bomb in armed condition and the lanyard suspended from shaft or loop catch 38.

When the coil 32 is de-energized, spring 39 moves shaft 38 to the left and therewith slug 36 until collar 40 engages the inner conical surface of the shaft bearing portion 27, as illustrated in Fig. 1. The lanyard is then forced downwardly by the surface 45 of retainer 19 and is free to drop away from the aircraft, thereby eliminating any damage to the aircraft or impairing the flying efficiency of the aircraft.

When a bomb is dropped in unarmed condition, solenoid 32 is not energized and, therefore, shaft 38 is not in position to intercept loop 22. Consequently, the loop 22 cams retainer 19 inwardly and drops free of the bomb arming control mechanism, leaving the bomb in unarmed condition.

From the foregoing description it will be apparent that this invention provides a bomb arming control mechanism adapted to accomplish three functions, the first of which is to retain a bomb arming lanyard for arming and dropping a bomb. The second function is to drop the lanyard after the lanyard comes free of the bomb. The third function is to permit release of the lanyard without arming the bomb. Thus, in high speed aircraft this device is adapted to prevent damage to the aircraft or impairment of flying efficiency.

The invention claimed is:

In a bomb arming control device for retaining and releasing the wire loop of a bomb lanyard, a cylindrical frame having its axis disposed horizontally, a fixed stop member spaced from one end of said frame, a lanyard loop retainer mounted in said frame for sliding movement toward or away from said stop, a downwardly and outwardly inclined surface on the upper portion of said retainer merging with the outer end of the same to support the lanyard loop against said fixed stop member, an upwardly and outwardly inclined face on the lower portion of said retainer terminating at said outer end and providing with said end a limited engaging surface with said fixed stop, spring means normally holding said retainer with said outer end in contact with said fixed stop member, a solenoid mounted concentrically within said frame, a reciprocable shaft slidable longitudinally within said retainer and movable outwardly by influence of said solenoid through said lower inclined face to engage with said stop below the point of contact of said retainer end therewith, the inclination of said lower face of said retainer being such as to join with said stop engaging surface a distance above the adjacent edge of said shaft greater than the transverse diameter of the lanyard wire, and spring means normally holding said shaft retracted from said stop.

References Cited in the file of this patent
UNITED STATES PATENTS

| | | |
|---|---|---|
| 1,385,598 | Weed | July 26, 1921 |
| 1,522,792 | Russell et al. | Jan. 13, 1925 |
| 1,880,122 | Cooke | Sept. 27, 1932 |
| 2,424,618 | Jones et al. | July 29, 1947 |
| 2,430,617 | Quinnell et al. | Nov. 11, 1947 |